United States Patent
Persson et al.

(10) Patent No.: US 8,558,893 B1
(45) Date of Patent: Oct. 15, 2013

(54) HEAD-UP SECURITY DISPLAY

(75) Inventors: Carl J. Persson, Olathe, KS (US); Thomas H. Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1238 days.

(21) Appl. No.: 11/833,747

(22) Filed: Aug. 3, 2007

(51) Int. Cl.
*H04N 7/18* (2006.01)

(52) U.S. Cl.
USPC .......................... 348/159; 348/151; 348/169

(58) Field of Classification Search
USPC ........................................ 348/159, 151, 169
See application file for complete search history.

(56) References Cited

U.S. PATENT DOCUMENTS

| | | | |
|---|---|---|---|
| 3,848,974 A | 11/1974 | Hosking et al. | |
| 6,452,544 B1 * | 9/2002 | Hakala et al. | 342/357.31 |
| 6,526,352 B1 | 2/2003 | Breed et al. | |
| 6,900,731 B2 | 5/2005 | Kreiner et al. | |
| 7,091,852 B2 | 8/2006 | Mason et al. | |
| 7,139,637 B1 | 11/2006 | Waddington et al. | |
| 7,245,216 B2 | 7/2007 | Burkley et al. | |
| 7,305,102 B2 | 12/2007 | Nagasaki | |
| 7,908,556 B2 * | 3/2011 | Shamma et al. | 715/719 |
| 8,055,296 B1 | 11/2011 | Persson et al. | |
| 8,264,422 B1 | 9/2012 | Persson et al. | |
| 8,355,961 B1 | 1/2013 | Ng et al. | |
| 2003/0064718 A1 | 4/2003 | Haines et al. | |
| 2003/0076980 A1 | 4/2003 | Zhang et al. | |
| 2003/0206099 A1* | 11/2003 | Richman | 340/506 |
| 2003/0222892 A1 | 12/2003 | Diamond et al. | |
| 2004/0082341 A1 | 4/2004 | Stanforth | |
| 2004/0199785 A1* | 10/2004 | Pederson | 713/200 |
| 2005/0048918 A1 | 3/2005 | Frost et al. | |
| 2005/0068171 A1* | 3/2005 | Kelliher et al. | 340/539.22 |
| 2005/0090201 A1 | 4/2005 | Lengies et al. | |
| 2005/0093976 A1* | 5/2005 | Valleriano et al. | 348/143 |
| 2005/0137786 A1 | 6/2005 | Breed et al. | |
| 2005/0181806 A1 | 8/2005 | Dowling et al. | |
| 2005/0200478 A1 | 9/2005 | Koch et al. | |
| 2006/0024627 A1 | 2/2006 | Platts | |
| 2006/0079187 A1 | 4/2006 | Struck | |
| 2006/0103590 A1 | 5/2006 | Divon | |
| 2006/0158329 A1 | 7/2006 | Burkley et al. | |
| 2007/0036100 A1* | 2/2007 | Shaffer et al. | 370/328 |
| 2007/0067104 A1 | 3/2007 | Mays | |
| 2007/0086764 A1 | 4/2007 | Konicek | |
| 2007/0132663 A1 | 6/2007 | Iba et al. | |
| 2007/0173266 A1 | 7/2007 | Barnes, Jr. | |
| 2007/0220108 A1 | 9/2007 | Whitaker | |

(Continued)

OTHER PUBLICATIONS

Ng, Sei Y., et al., "Distribution Center Head-up Display", filed Aug. 3, 2007, U.S. Appl. No. 11/833,758.

(Continued)

*Primary Examiner* — Mohamed Ibrahim
*Assistant Examiner* — Thomas Richardson

(57) ABSTRACT

A security system worn by an individual is provided for monitoring an adjacent area. The security system includes a mobile device in communication with an audio device, a camera, and a transparent display. The camera captures an image. The audio device inputs audio information associated with the image, wherein the information includes a priority. The transparent display displays images captured via other mobile devices and information associated with the images captured via the other mobile devices. The mobile device is associated with a location engine configured to determine a location of the mobile device.

18 Claims, 8 Drawing Sheets

(56) References Cited

U.S. PATENT DOCUMENTS

| | | | |
|---|---|---|---|
| 2008/0055194 A1 | 3/2008 | Baudino et al. | |
| 2008/0088527 A1 | 4/2008 | Fujimori et al. | |
| 2008/0089587 A1 | 4/2008 | Kim et al. | |
| 2008/0215202 A1 | 9/2008 | Breed | |
| 2009/0011799 A1 | 1/2009 | Douthitt et al. | |
| 2009/0322881 A1* | 12/2009 | Shu et al. | 348/148 |
| 2010/0029296 A1 | 2/2010 | Noonan et al. | |

OTHER PUBLICATIONS

Office Action dated Sep. 23, 2008, U.S. Appl. No. 11/833,758 (19 pgs.).
Final Office Action dated Feb. 2, 2011, U.S. Appl. No. 11/936,074.
Advisory Action dated Apr. 22, 2011, U.S. Appl. No. 11/936,074.
Notice of Allowance dated Jun. 23, 2011, U.S. Appl. No. 11/936,074.
Persson, Carl J., et al., "Head-up Display Communication System and Method", filed Nov. 6, 2007, U.S. Appl. No. 11/936,074.
Persson, Carl J., et al., "Safe Head-up Display of Information", filed Nov. 8, 2007, U.S. Appl. No. 11/937,488.
Office Action dated Jul. 12, 2010, U.S. Appl. No. 11/936,074 (6 pgs.).
Office Action dated Aug. 22, 2011, U.S. Appl. No. 11/937,488.
Office Action dated Aug. 16, 2010, U.S. Appl. No. 11/936,074 (11 pgs.).
Final Office Action dated Mar. 13, 2009, U.S. Appl. No. 11/833,758 (25 pgs.).
Advisory Action dated May 21, 2009, U.S. Appl. No. 11/833,758 (4 pgs.).
Examiner's Answer dated Nov. 25, 2009, U.S. Appl. No. 11/833,758 (25 pgs.).
Notice of Allowance dated May 4, 2012, U.S. Appl. No. 11/937,488, filed Nov. 8, 2007.
Decision on Appeal dated Mar. 9, 2012, U.S. Appl. No. 11/833,758, filed Aug. 3, 2007.
Office Action dated Jan. 27, 2012, U.S. Appl. No. 11/937,488, filed Nov. 8, 2007.
Notice of Allowance and Fee(s) Due dated Sep. 7, 2012, U.S. Appl. No. 11/833,758.

* cited by examiner

HEAD-UP SECURITY DISPLAY

CROSS-REFERENCE TO RELATED APPLICATIONS

This nonprovisional patent application is related to concurrently filed U.S. patent application Ser. No. 11/833,758 titled "Distribution Center Head-up Display," by Sei Y. Ng, et al, which is herein incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Security workers can use mobile devices for monitoring a security environment. However, the accuracy of oral or written reports varies widely from one worker to another. The use of security cameras may solve the accuracy problem, but can create additional problems for discretely focusing on a suspicious person. Workers who do not hear all the details of a transmitted oral report due to background noise may require the report to be repeated, thereby losing response time.

SUMMARY

In some embodiments, a security system worn by an individual is provided for monitoring an adjacent area. The security system includes a mobile device in communication with an audio device, a camera, and a transparent display. The camera captures an image. The audio device inputs audio information associated with the image, wherein the information includes a priority. The transparent display projects images captured via other mobile devices and information associated with the images captured via the other mobile devices. The mobile device is associated with a location engine configured to determine a location of the mobile device.

In other embodiments, a method is provided for monitoring an adjacent area. An electronic tag associated with an item is detected. Information associated with the electronic tag is determined. Information associated with the electronic tag is output to at least one of an audio device and a transparent display in communication with a mobile device. An item of interest is identified to a user of the mobile device via the transparent display.

In still other embodiments, a security system worn by an individual is provided for monitoring an adjacent area. The security system includes a mobile device in communication with an audio device and a camera. The mobile device partitions a view into sections. The audio device receives a selection of a section by a user of the mobile device. The camera captures an image of the section. The mobile device associates information with the image of the section.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In embodiments of the present disclosure, security methods and systems are provided for monitoring an adjacent area. The security system includes a mobile device in communication with an audio device, an integrated or independent camera, and a transparent display. A mobile device user can orally submit both commands for the camera and prioritized reports through the audio device, enabling the user to discretely monitor the security environment while leaving the users hands free for other tasks. Oral commands can discretely focus the camera on any section in the user's point of view to capture an image of an item or person of interest. The mobile device can project captured images and any information associated with the images to the user's transparent display and other users' transparent displays. The transparent display can project images on a lens worn by the user, such that the user does not have to look down or away from items in the security environment to see the information. The mobile device can also convert information to audio signals and output the signals to audio devices, thereby providing information in an audio format that the user may select to supplement the visual information. The mobile device can identify an item by using a reader operable to identify or read electronic tags associated with the item. The mobile device can also identify an item by using a camera to capture an image of the item and comparing images, such as comparisons using facial recognition software. The mobile device can also use a location engine to determine the location of the mobile device, to identify the locations where audio information is submitted and images are captured. Based on all of the information, the mobile device can designate an item as an item of interest for users of the same or other mobile devices.

Figure 1:
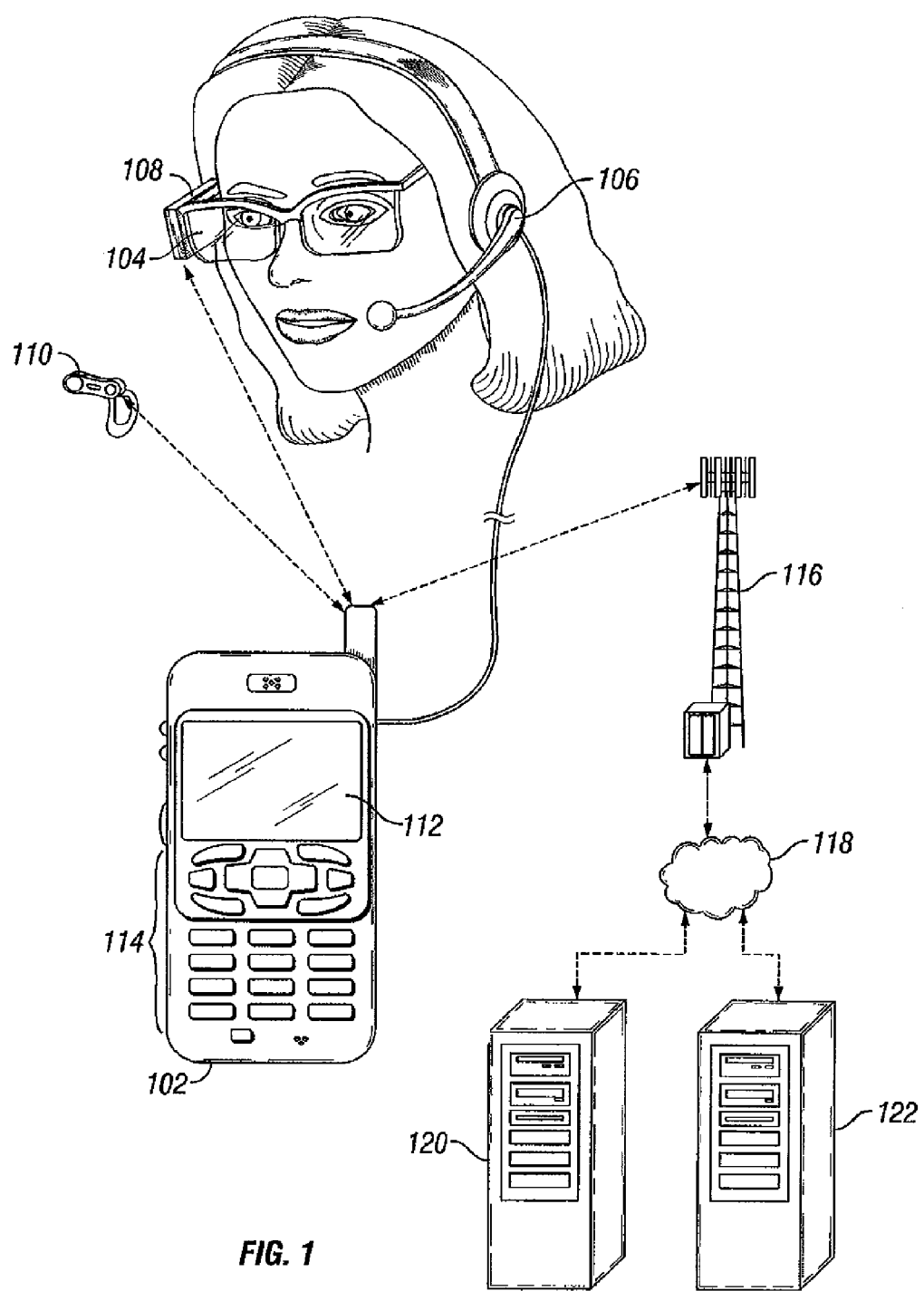
FIG. 1 shows an illustrative wireless communications system for monitoring an adjacent area.

FIG. 1 shows a wireless communications system 100 that illustrates the context for the present disclosure's systems and methods. The wireless communication system 100 includes an illustrative mobile device 102. Though illustrated as a mobile phone, the mobile device 102 may take various forms including a personal digital assistant (PDA), a mobile computer, a digital camera, a mobile phone or mobile communications device, and a digital music player. Many suitable mobile devices combine some or all of these functions.

The mobile device 102 can communicate with a transparent display 104 and an audio device 106. The transparent display 104, which can function as a head-up security display, includes a user wearable lens and a projector 108 to project images on the lens. The mobile device 102 can output content to the transparent display 104 that is projected as virtual images on the lens. The virtual or see-through images overlay the user's view of reality. The mobile device 102 can also project the content to the transparent display's 104 side panes that the user can conveniently view without any head movement by the user. The audio device 106 includes a microphone to input the user's audio signals and a speaker to output audio signals to the user. The audio device 106 may be a headset, an earpiece with a microphone, or any similar device that combines a speaker with a microphone. The mobile device 102 can also communicate with a camera 110 that can capture images of items viewed through the transparent display 104. Because the camera 110 can be located near the transparent display's 104 projector 108, the camera 110 can provide feedback to the mobile device 102 regarding what the user can see. The camera feedback can include the viewer's orientation, such as facing due north in an airport terminal that is oriented from south to north.

The mobile device 102 includes a display 112 and a touch-sensitive surface or keys 114 with which the user can also interact. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction, such as associating information with an image of an item.

In the illustrative system 100, the mobile device 102 communicates through a cell tower 116 and a wired or wireless network 118 to access information on various servers, such as a communication server 120 and a content server 122. While one cell tower is shown in FIG. 1, other cell towers could be present. The mobile device 102 may also communicate through wireless access points to the content server 122. The content server 122 may provide content that may be shown on the transparent display 104. The content server 122 can include a database for items that can be identified in a security environment.

Figure 2:
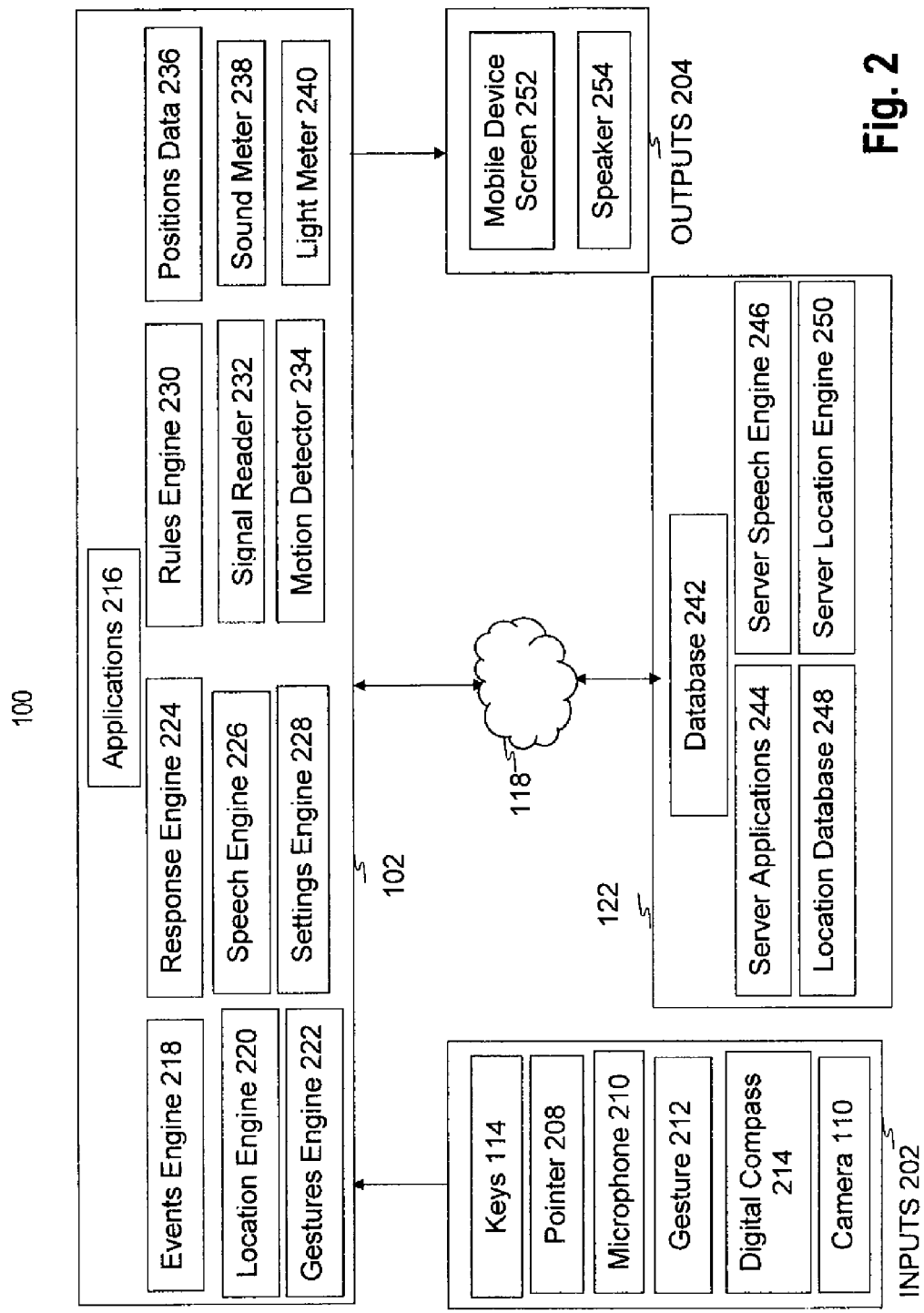
FIG. 2 shows a block diagram of an illustrative wireless communications system for monitoring an adjacent area.

FIG. 2 is a block diagram illustrating the wireless communications system 100 for monitoring an adjacent area according to some embodiments of the present disclosure. The system includes inputs 202 to and outputs 204 from the mobile device 102. The inputs 202 can be via the keys 114, a pointer 208, a microphone 210, a gesture 212 input, a digital compass 214, and the camera 110. For example, a supervisor of the user can associate information with an image of an item via the keyboard 206, which can be a computer keyboard in communication with the content server 122. The associated information can be communicated to the mobile device 102, and projected on the transparent display 104 or output as an audio signal via the audio device 106. Additionally, the supervisor can associate information with an image of an item through the pointer 208, which can be a computer mouse or similar input device in communication with the content server 122. The user can speak into the microphone 210 on the audio device 106 to associate information with an image of an item.

The user can enter a gesture 212 input to the mobile device 102 by aligning the user's finger with an option projected on the transparent display 104. The camera 110 captures an image, for example, of the finger and its location, which can be identified as aligned with the option projected on the transparent display 104. Alternatively, the user can enter a gesture 212 input into the mobile device 102 via a head nod or some other motion detected by the mobile device 102 or the transparent display 104. The mobile device 102 can process the gesture 212 input by executing the option selected by the user's finger. The digital compass 214 is on the transparent display 104 and is a multi-axis sensor that can determine not only the heading, but also the roll and the pitch for the transparent display 104. The digital compass 214 inputs information to the mobile device 102 to identify the transparent display's 104 orientation, and hence the view of the user. For example, if the user's head is facing directly north-east, directly toward the horizon, and without any tilt, the digital compass 214 inputs the orientation to the mobile device 102. The orientation information enables the mobile device 102 to project images on the transparent display 104 as transparent overlays on items whose images are captured by the camera 110. For example, when the user is looking at a specific item in a security environment, the camera 110 can capture an image of the item that is recognized by the mobile device 102. The mobile device 102 can respond by outputting a transparent overlay on the transparent display 104, based on the orientation information, which identifies the item to the user. An example of a transparent overlay projected on the transparent display 104 is described below in reference to FIG. 3.

The mobile device 102 can include components 216 to 240 that can assist a user in monitoring an adjacent area. The components 216 to 240 can include applications 216, an event engine 218, a location engine 220, a gestures engine 222, a response engine 224, a speech engine 226, a settings engine 228, a rules engine 230, a signal reader 232, a motion detector 234, positions data 236, a sound meter 238, and a light meter 240. The applications 216 can provide interfaces between the mobile device 102, the inputs 202, the outputs 204, and the content server 122. The events engine 218 can determine when to send some of the outputs 204 based on periodic events, such as an hourly text message of security reminders sent by the user's supervisor. The location engine 220 can execute a location fix technology for the mobile device 102 to determine the location of the mobile device 102. The gestures engine 222 can recognize the significance of the gesture 212 input as captured by the camera 110 and determine the response to the gesture 212 input.

The response engine 224 can execute the appropriate response for a gesture 212 input or other inputs 202. The speech engine 226 can convert audio signals input via the microphone 210 on the audio device 106 and execute speech recognition software to determine the appropriate response to the audio signal. For example, when the user says "section 6,"

the microphone 210 inputs this audio signal and the speech engine converts the audio signal to a request for the camera 110 to record the image in section 6 of a view. The speech engine 226 can also execute speech recognition software to convert audio information to text, such as converting oral comments recorded by one mobile device user to text projected on the transparent display of another mobile device user. The settings engine 228 can keep track of settings for the mobile device 102, such as the intensity of images projected on the transparent display 104 and whether speech input is enabled.

The rules engine 230 can specify the procedure used in processing information associated with an image, such as processing information input as audio before processing information associated with an electronic tag. The signal reader 232 is an electronic signal reader that consists of one or more separate or integrated readers. These readers may include a radio antenna that can detect radio signals from an item such as a mobile phone, a near field communication (NFC) reader that can detect NFC signals from the item, and a radio frequency identification (RFID) reader that can detect a RFID signal from an item's RFID tag, and determine the item's identity based on the item's signals. The signal reader 232 can be used to associate any additional information with the item. The motion detector 234 can function as a pedometer to assist in determining the location of the mobile device 102 as the user walks in the security environment.

The positions data 236 can assist the mobile device 102 in determining item information based on the position of the monitored item relative to the position of the mobile device 102 and the position of any fixed locations in the security environment. The sound meter 238 can evaluate the audio signal via the microphone 210 to determine when background sounds are so loud that the speech engine 226 will have difficulty with speech recognition or the user will have difficulty hearing outputs via the audio device 106. The light meter 240 can evaluate the security environment's light via the camera 110 to determine when the light is so bright that the camera 110 will have difficulty identifying items, images, and gestures, or the user will have difficulty viewing outputs via the transparent display 104.

The content server 122 can include a database 242, server applications 244, a server speech engine 246, a location database 248, and a server location engine 250 to assist the mobile device 102 in monitoring an adjacent area. The database 242 can store captured images of items to assist the user of the mobile device 102 to identify an item. The server application 244 can provide interfaces between the mobile device 102 and the content server 122.

The server speech engine 246 can convert audio signals input via the microphone 210 and execute speech recognition software to determine the appropriate response to the audio signal. The locations database 248 can store mobile device 102 location information. The server location engine 250 can process location information. The functions of recognizing speech, storing location information, and processing location information can be implemented on the mobile device 102, the content server 122, or a combination of the mobile device 102 and the content server 122. The location of various components in FIG. 2 are depicted as illustrative examples only because some of the components 216 to 240 can be implemented on the content server 122 and some of the components 242 to 250 can be implemented on the mobile device 102.

The outputs 204 include a mobile device screen 252 and a speaker 254. The mobile device screen 252 is the graphic output for the transparent display 104. The speaker 254 is the audio output for the audio device 106.

Figure 3:
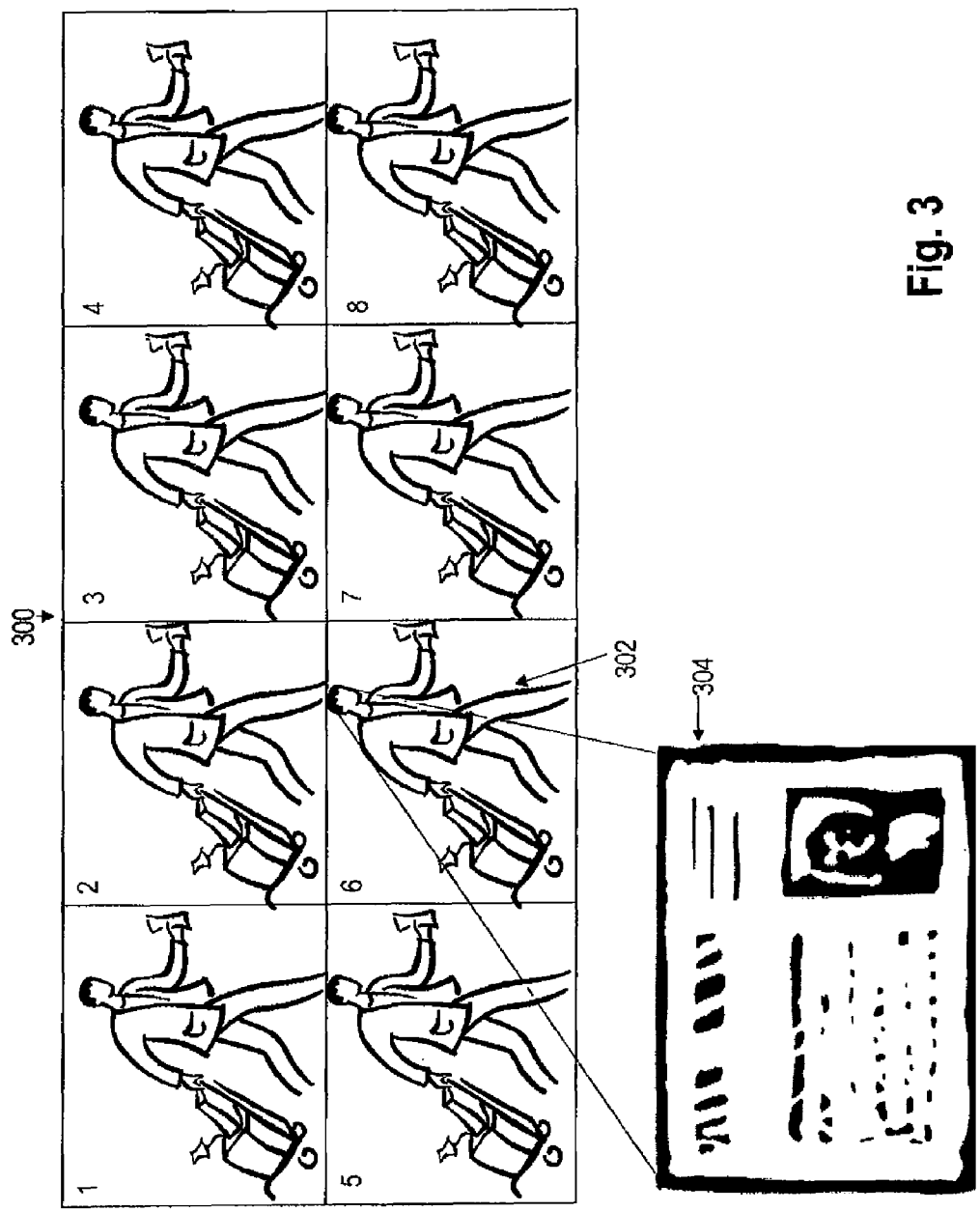
FIG. 3 shows a graphic user interface for monitoring an adjacent area according to some embodiments of the present disclosure.

FIG. 3 shows a graphic user interface 300 for monitoring an adjacent area according to some embodiments of the present disclosure. The graphic user interface 300 depicts the user's view of a security environment through the transparent display 104, such as a view of passengers in an airport terminal, with the view partitioned into sections. The graphic user interface 300 projects dividing lines and reference numerals to partition the view into numbered sections, such as the 8 sections in FIG. 3. Although the view can be divided by lines into numbered sections, other ways of dividing the view could be used as well. The audio device 106 can detect the user selecting a section of the view by speaking the reference numeral corresponding to the section. For example, the user views travelers in an airport terminal, and speaks the number "6" to capture an image of a traveler 302 in section number 6. The speech engine 226 executes speech recognition software to recognize the section selected by the user. The mobile device 102 can respond to this selection by instructing the camera 110 to capture an image of section 6. The image can be a still image, such as a photograph, or continuous images, such as a motion picture.

The mobile device 102 can associate information with the image captured by the camera 110. For example, the mobile device 102 can analyze the image of the traveler 302 by initiating one of the applications 216 to execute facial recognition software. The mobile device 102 can compare the image of the traveler 302 to images stored in the database 242 in the server 122. This comparison can determine if the traveler 302 is identified as a person of interest by local, national, or international law enforcement agencies. For example, the facial recognition software matches the traveler 302 with a driver's license 304, and the mobile device 102 outputs an image of the driver's license 304 to the transparent display 104. Additionally, the mobile device 102 can output information associated with the traveler 302 via the audio device's 106 speaker 254. For example, if the mobile device 102 identifies the traveler 302 as a person on a wanted list, the mobile device 102 can output high pitched beeps and/or other audio or video warning message to the audio device's 106 speaker 254 and mobile device screen 252.

Although the driver's license 304 is depicted on a lower part of the graphic user interface 300, the transparent display 104 can also project the driver's license 304 to side planes on the transparent display 104 or as a transparent overlay over the view of the traveler 302. Additionally, the mobile device 102 can project the captured image of the traveler 302 and the driver's license 304 to other mobile devices. The mobile device 102 can project the image and information automatically, such as in response to the database 242 identifying the traveler 302 as a person of interest, or based on a user request, such as in response the user recording suspicious behavior and speaking a request to share the image and information with other mobile devices. Likewise, the mobile device 102 can project images and information from other mobile devices.

Additionally, the signal reader 232 on the mobile device 102 can detect signals associated with an item. The signal reader 232 may include one or more of an RFID reader, a near field communication (NFC) reader, a radio antenna, or other signal reader type, and these may be integrated or separate. For example, the traveler 302 may have an airline ticket with a RFID tag and a mobile phone with a unique electronic identifier. The mobile device 102 can determine information associated with the electronic tags, such as the airline ticket's purchaser and the mobile phone's owner. The mobile device 102 can project this information via the transparent display 104, similar to the projection of the driver's license 304. The user can evaluate the information associated with the traveler 302 and make an oral report via the audio device's 106 microphone 210.

Such oral reporting makes reporting more convenient for the user, enabling reports to be made whenever information becomes available. Examples of oral reports can include "the driver's license does not match either the ticket's purchaser or the mobile phone's owner," or "this person is nervously scanning the terminal." Oral reports include a user-assigned priority, such that the mobile device 102 outputs the report to mobile devices based on the priority. For example, the user assigns a low priority to a nervous traveler whose driver's license and airline ticket match, such that this low priority report is reviewed later by the user's supervisor. If the user views highly suspicious activity, the user can assign a high priority to a suspicious traveler, which could result, for example, in the mobile device 102 outputting the image of the suspicious traveler and the report to all other mobile devices and potentially highlighting the image of the identified traveler when this traveler appears in the view of other mobile device users.

If the sound meter 238 detects too much background noise, such that the speech engine 226 has difficulty with speech recognition from audio inputs, the mobile device 102 can temporarily disable speech input. If the user is having difficulty hearing outputs via the audio device 106, the user can request to temporarily disable speech output. When speech is temporarily disabled, subsequent inputs can still occur via the camera 110 and subsequent outputs can still occur via the transparent display 104. Based on the user's preferences, the user may have previously selected for some outputs to occur via the transparent display 104 and some outputs to occur via the audio device's 106 speaker 254. If the user temporarily disables speech, all outputs may occur via the transparent display 104, even outputs previously occurring via the audio device's 106 speaker 254. Likewise, the intensity of the security environment light detected by the camera 110 may be too bright for inputs via the camera 110 and outputs via the transparent display 104. The mobile device 102 can respond to the excessively bright light by conducting all subsequent inputs via the audio device's 106 microphone 210 and all subsequent outputs via the audio device's 106 speaker 254. When the background sound or the detected light returns to a level that enables the previous input and output selections, the mobile device 102 can either automatically revert to the selections or provide the user with the option of reverting to the selections.

The driver's license 304 is used as an illustrative example, as the transparent display 104 can project other information to assist the user in monitoring an adjacent area. For example, the transparent display 104 can overlay a person of interest with flashing yellow light, such that the person of interest appears to be flashing yellow to the user.

Figure 4:
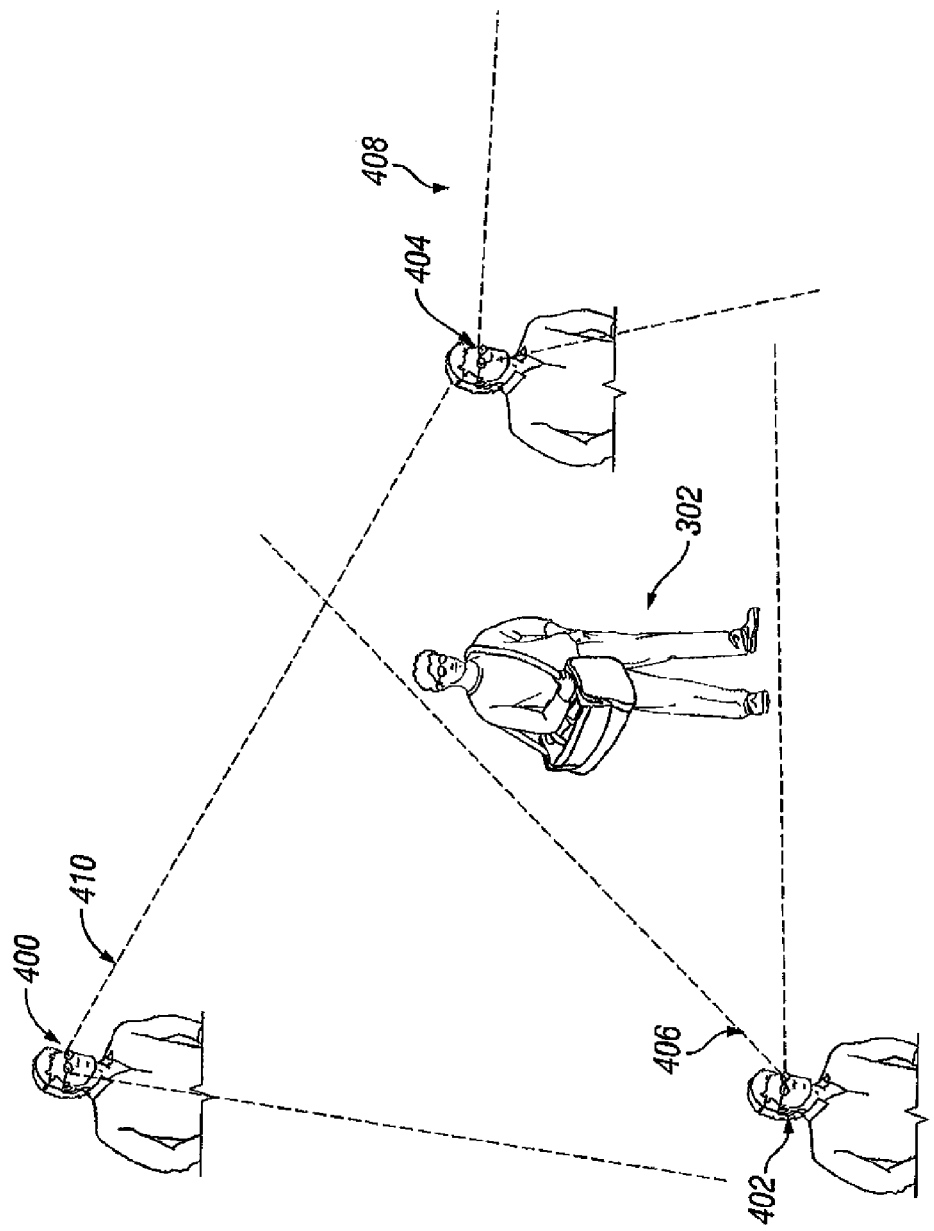
FIG. 4 shows an environment for monitoring an adjacent area according to some embodiments of the present disclosure.

FIG. 4 shows an environment for monitoring an adjacent area according to some embodiments of the present disclosure. The environment includes a first user 400, a second user 402, and a third user 404. The second user 402 has a primary view 406 of the traveler 302, the third user 404 has a view 408 that does not include the traveler 302, while the first user 400 has a secondary view 410 of the traveler 302. Because the second user's 402 mobile device identifies the traveler 302 as a person of interest, the second user's 402 transparent display overlays the traveler 302 with flashing yellow light. Because the second user's 402 mobile device outputs the identification of the traveler 302 as a person of interest to all other mobile devices, the traveler 302 also appears to be flashing yellow to the first user's 400 transparent display. Although the traveler 302 is not in the view 408 of the third user 404, the third user's 404 RFID reader detects the airline ticket of the traveler 302 as the traveler 302 approaches the third user 404 from behind. In response, the third user's 404 audio device outputs high pitched beeps and an audio warning message that informs the third user 404 of the approaching traveler 302. When the third user 404 discreetly turns to view the traveler 302, the third user 404 easily identifies the traveler 302 because the traveler 302 appears to be flashing yellow to the third user 404.

Figure 5:
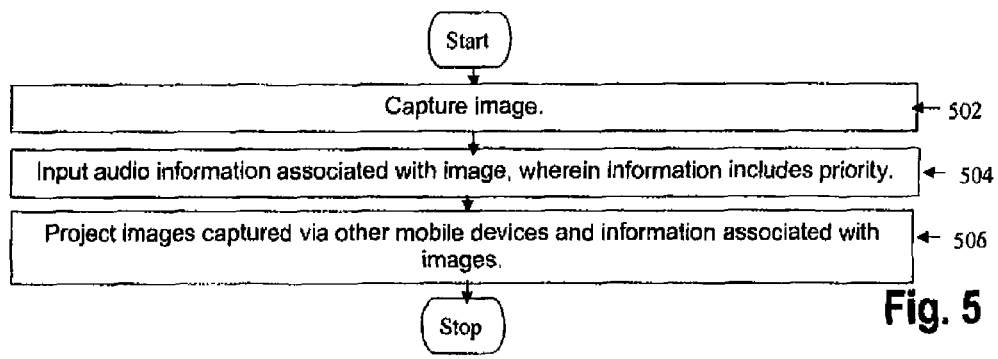
FIG. 5 shows a flowchart of a method for monitoring an adjacent area according to some embodiments of the present disclosure.

FIG. 5 is a flowchart illustrating a method for monitoring an adjacent area according to some embodiments of the present disclosure. The mobile device 102 can use the method to associate and project images with information that includes priorities.

In box 502, the camera captures an image. For example, the camera 110 captures an image of the traveler 302.

In box 504, the audio device inputs audio information associated with the image, wherein the information includes a priority. For example, the audio device 106 records user comments about the traveler's 302 suspicious activities and a spoken priority assigned to the traveler 302 based on these activities.

In box 506, the transparent display projects images captured via other mobile devices and information associated with images. For example, the transparent display 104 projects images of another traveler captured by the second user's 402 camera 110 and any information that the second user 402 recorded about the other traveler. The mobile device 102 can project images and information based on location, such as when a person of interest is in view of the user. The mobile device 102 can also project images and information in response to a user request, such as when the user requests additional information related to a person of interest.

The transparent display 104 can use the digital compass 214 to determine an orientation of the transparent display 104 such that the projection of the information can be based on the location of an item relative to the location of the transparent display 104. The item information can be light projected on the transparent display 104, with the light changing based on the relative locations of the item and the transparent display 104. For example, the traveler 302 in FIG. 3 appears to be flashing yellow when the traveler is to the north of the transparent display 104. The flashing yellow light overlay follows the traveler 302 as the traveler 302 walks to the north-east of the transparent display 104.

This item information can be output to the transparent display 104 or converted to an audio signal and output to the audio device's 106 speaker 254. For example, in response to the database 242 identifying the traveler 302 as a person of interest, the mobile device 102 can use speech recognition software to convert the identification of this person from text to an audio warning message and output this warning message to the audio device's 106 speaker 254.

Figure 6:
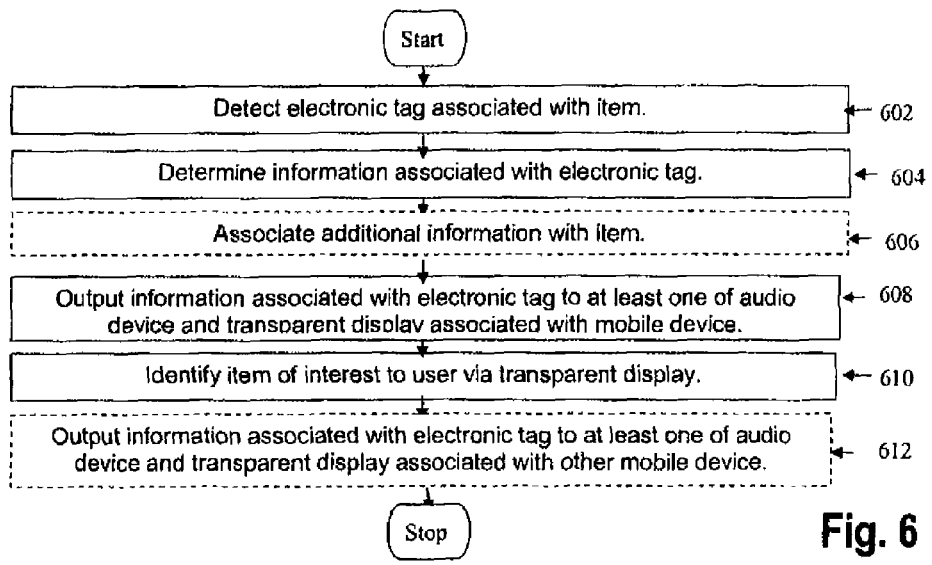
FIG. 6 shows a flowchart of another method for monitoring an adjacent area according to some embodiments of the present disclosure.

FIG. 6 is a flowchart illustrating another method for monitoring an adjacent area according to some embodiments of the present disclosure. The mobile device 102 can use the method to determine and output information associated with electronic tags.

In box 602, an electronic tag associated with an item is detected. For example, the mobile device 102 detects a RFID tag associated with the traveler's 302 airline ticket.

In box 604, information associated with the electronic tag is determined. For example, the mobile device 102 accesses the database 242 on the server 122 to identify the name of the person who purchased the traveler's 302 airline ticket.

In box 606, additional information is optionally associated with the item. For example, the audio device 106 records user comments about the traveler's 302 suspicious activities. The mobile device 102 can receive the additional information via the audio device's 106 microphone 210, the pointer 208, the keyboard 206, or the camera 110. For example, the user's supervisor can use the pointer 208 or the keyboard 206 to note the similarity of the traveler 302 to an unidentified traveler observed on a previous day. The camera 110 can capture an image of the item to compare the captured image to stored images to assist a user in identifying the item. For example, the camera 110 captures an image of the traveler 302, and compares the captured image to stored images in the database 242 to identify the traveler 302. In response to the identification, the mobile device 102 outputs an overlay of the driver's license 304 to the transparent display 104 to identify the traveler 302 to the user.

In box 608, the information associated with the electronic tag is output to at least one of an audio device and a transparent display associated with the mobile device. For example, the mobile device 102 outputs the identity of the airline ticket purchaser to the audio device's 106 speaker 254 or the transparent display 104. When the mobile device 102 outputs an audio signal to the audio device's 106 speaker 254, the audio signal can change based on the relative locations of the item and the mobile device 102. In this example, the audio signal can be a warning message and beeps that increase in frequency as the traveler 302 with the identified airline ticket moves closer to the third user's 404 mobile device while the third user's 404 view 408 does not include the traveler 302.

In box 610, an item of interest is identified to the user via the transparent display. For example, the mobile device 102 identifies the traveler 302 as a person of interest by projecting relevant information from a wanted persons watch list on the transparent display 104 and highlighting the traveler 302 with flashing red light. Items of interest can be identified by information in the database 242 or by user comments of suspicious activities, as recorded by the audio device's 106 speaker 254. In another example, the mobile device 102 identifies a suspicious piece of luggage or bag that has been left behind or is changing hands from one person to another person.

In box 612, information associated with the electronic tag is optionally output to at least one of an audio device and a transparent display associated with another mobile device. For example, the mobile device 102 outputs information associated with the traveler's 302 airline ticket to the first user's 400 mobile device and the third user's 404 mobile device. The information can be output via the cell tower 116 and the network 118 to the other mobile devices.

Figure 7:
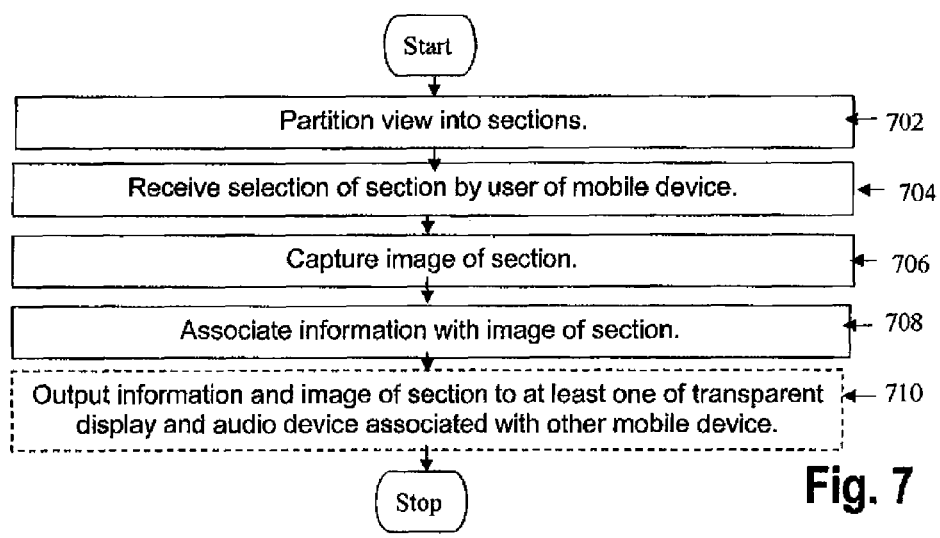
FIG. 7 shows a flowchart of yet another method for monitoring an adjacent area according to some embodiments of the present disclosure.

FIG. 7 is a flowchart illustrating yet another method for monitoring an adjacent area according to some embodiments of the present disclosure. The mobile device 102 can use the method to capture images of sections in a view, associate information with the images, and output the images and information to other mobile devices.

In box 702, the mobile device partitions a view into sections. For example, the mobile device 102 partitions the view in FIG. 3 into 8 sections.

In box 704, the mobile device receives a selection of a section by a user of the mobile device. For example, the audio device 106 records the user speaking the number "6" to select section 6 of the partitioned view in FIG. 3. The mobile device 102 can use the speech engine 226 to execute speech recognition software for recognizing selections input via the audio device's 106 microphone 210. The mobile device 102 can also input selections submitted by the user's supervisor via the pointer 208 or the keyboard 206 for the supervisor's computer. Additionally, the mobile device 102 can use the gestures engine 222 to execute gesture recognition software for recognizing images of gestures captured via the camera 110 or otherwise. For example, the gestures engine 222 can determine that the location of the user's index finger, as captured by the camera 110, is aligned with the location of a section projected on the transparent display 104, such that to the user's perspective the user's index finger appears to be touching the section. In this situation, which may occur when background noise is too loud for the speech engine 226 to accurately recognize speech commands, the gestures engine 222 enables the mobile device 102 to select the section identified by the user's index finger.

In box 706, the camera captures an image of the section. For example, the camera 110 captures an image of section 6 in FIG. 3, including the traveler 302.

In box 708, the mobile device associates information with the image of the section. For example, the audio device 106 records user comments about the traveler 302. The information can include a time the image is captured, a geographic location of the image, and information input via the audio device's 106 microphone 210 or any pointer associated with the mobile device 102, such as the user's finger. The information can also include an item's location. For example, while monitoring an office building late at night, the user' notices an office door that is slightly ajar. By comparing the location of the door to a previous image taken at the same location by another user, the user can determine that the door was left open by an office worker who is working late. The mobile device 102 can determine its geographic location, for example, using at least one of a radio frequency identification technology, a global positioning system technology, a forward link triangulation technology, a hybrid technology, and a motion detector technology.

The mobile device 102 can determine its location using radio frequency identification technology by identifying electronic tags of fixed items in the security environment, referencing the location database 248 to determine where these items are located in the security environment, and fixing the location of the mobile device 102 in the security environment based on the relationship between the locations of the mobile device 102 and the identified items. The identified items can be fixed items in the security environment with fixed electronic tags specifically used as beacons for determining relative location in the security environment.

The mobile device 102 can use a global positioning system (GPS) technology to fix the location of the mobile device 102. Global positioning system satellites transmit signals that are received by the mobile device 102. The mobile device 102 determines its position based on the different signals received from different satellites. The location accuracy is environment driven and dependant on the type of equipment used. The global positioning system technology is owned and operated by the U.S. Department of Defense, but is available for general use around the world.

The mobile device 102 can use forward link triangulation technology to determine its position based on the different radio frequency signals received from different cell towers, such as the cell tower 116 and other cell towers. In radio communications, a forward link is the link from a fixed location, such as the cell tower 116, to the mobile device 102. If the link includes a communications relay satellite, the forward link will consist of both an uplink from a base station to the satellite and a downlink from the satellite to the mobile device 102. Each serving cell tower broadcasts a system parameters information message to the mobile device 102. This message includes the longitude and the latitude of the serving cell tower. The radius covered by serving cell towers vary greatly, from hundreds of meters in dense urban areas to 20 miles or more in rural environments. The forward link triangulation technology fixes the location of the mobile device 102 based on measurements taken of time and distance signals from nearby cell towers. The mobile device 102 reports the time and distance measurements to the network 118, then the network 118 triangulates a location fix of the mobile device 102, and reports the location fix back to mobile device 102. In general, more than three surrounding cell towers are preferred to triangulate an optimal location fix.

The mobile device 102 can use a hybrid technology to fix the location of the mobile device 102 based on a combination of other location fix technologies. For example, if the mobile device 102 is indoors, but close to a window, the global positioning system technology in combination with a cell tower location technology can calculate the location fix for the mobile device 102. When the mobile device 102 is indoors, the mobile device 102 may receive signals from an insufficient number of satellites to determine the position of the mobile device 102. However, the hybrid technology can combine the signals from the insufficient number of satellites with the cell tower location identified by the channel length modulation to calculate a hybrid location fix for the mobile device 102.

The mobile device 102 can also use motion detector technology to fix the location of the mobile device 102. For example, the motion detector 102 fixes its location as the south end of an airport terminal based on forward link triangulation technology. If the motion detector 234, functioning as a pedometer, detects that the user of the mobile device 102 has walked 15 meters due north, the mobile device 102 combines the information from forward link triangulation technology and motion detector technology to fix the current location of the mobile device 102 as 15 meters north from the south end of the airport terminal.

In box 710, the mobile device outputs information and the image of the section to at least one of a transparent display and an audio device associated with another mobile device. For example, the mobile device 102 outputs the image of the traveler 302 in section 6 and information associated with the traveler 302 to the first user's 400 mobile device 102 and the third user's 404 mobile device 102. The information can be output via the cell tower 116 and the network 118 to the other mobile devices 102.

Figure 8:
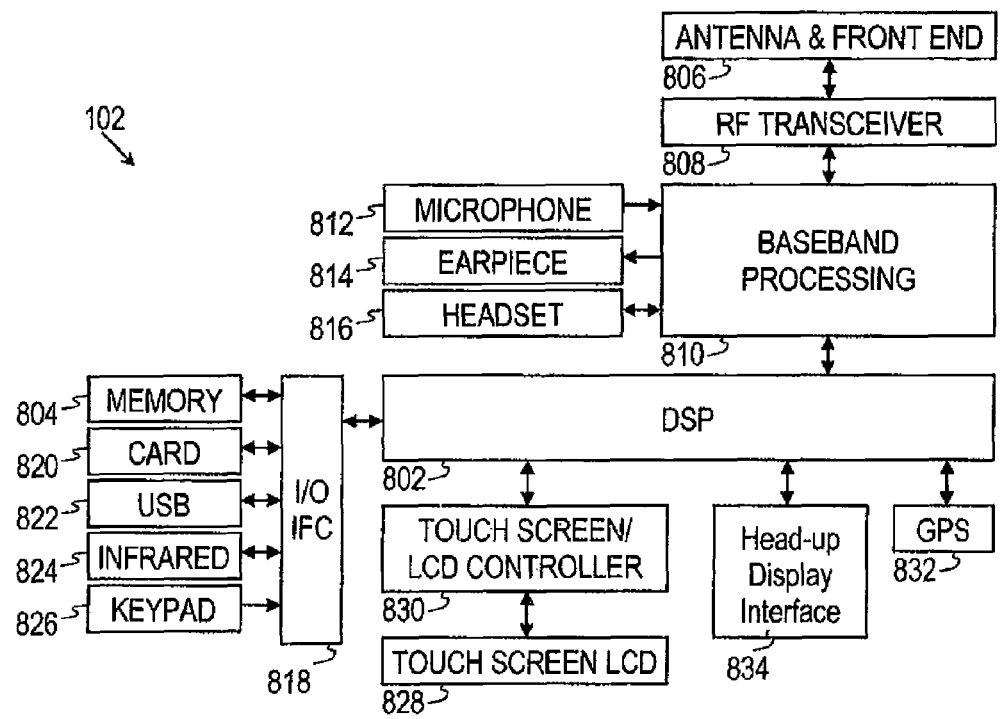
FIG. 8 shows a block diagram of an illustrative mobile device.

FIG. 8 shows a block diagram of the mobile device 102. The mobile device 102 includes a digital signal processor (DSP) 802 and a memory 804. As shown, the mobile device 102 may further include an antenna and front end unit 806, a radio frequency (RF) transceiver 808, a baseband processing unit 810, a microphone 812, an earpiece speaker 814, a headset port 816, an input/output interface 818, a memory card 820, a universal serial bus (USB) port 822, an infrared port 824, a keypad 826, a liquid crystal display (LCD) with a touch sensitive surface 828, a touch screen/LCD controller 830, a global positioning system (GPS) sensor 832, and a head-up display interface 834. In some contexts, the head-up display interface 834 may be referred to as a heads-up display interface.

The DSP 802 or some other form of controller or central processing unit operates to control the various components of the mobile device 102 in accordance with embedded software or firmware stored in the memory 804. In addition to the embedded software or firmware, the DSP 802 may execute other applications stored in the memory 804 or made available via information carrier media such as portable data storage media like the memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802 to execute the methods for the head-up security display. In some contexts, the head-up security display may be referred to as a heads-up security display.

The antenna and front end unit 806 converts between wireless signals and electrical signals, enabling the mobile device 102 to send and receive information from a cellular network or some other available wireless communications network. The RF transceiver 808 may provide frequency shifting, e.g., converting received RF signals to baseband and converting baseband transmit signals to RF. The baseband processing unit 810 may provide channel equalization, decoding, and signal demodulation to extract information from received signals, and may code and modulate information to create transmit signals, and may provide filtering for signals. To that end, the baseband processing unit 810 includes ports for connecting to the built-in microphone 812 and the earpiece speaker 814 that enable the mobile device 102 to be used as a cell phone. The DSP 802 can also execute the baseband processing.

The DSP 802 can send and receive digital communications with a wireless network via the baseband processing unit 810. The input/output interface 818 interconnects the DSP 802 and various memories and interfaces. The memory 804 and the removable memory card 820 may provide software and data to configure the operation of the DSP 802. The infrared port 824 and other optional ports such as a Bluetooth interface or an IEEE 802.11 compliant wireless interface enable the mobile device 102 to communicate wirelessly with other nearby mobile devices 102 and/or wireless base stations. In some contemplated systems, the mobile device 102 is able to wirelessly exchange information at a point-of-sale when placed near a suitable transceiver.

The keypad 826 couples to the DSP 702 via the I/O interface 818 to provide one mechanism for the user to make selections, enter information, and otherwise provide input to the mobile device 102. Another input mechanism may be the touch screen display 828, which may also display text and/or graphics to the user. The display controller 830 couples the DSP 802 to the touch screen display 828.

The GPS sensor 832 is coupled to the DSP 802 to decode global positioning system signals, thereby providing at least one technology for the mobile device 102 to determine its location. Alternatively, GPS processing may be provided by a dedicated GPS chip or processor. The head-up display interface 834 enables communication between the mobile device 102, the transparent display 104, the audio device 106, and the camera 110. Various other peripherals may also be included to provide additional functions, e.g., radio and television reception.

Figure 9:
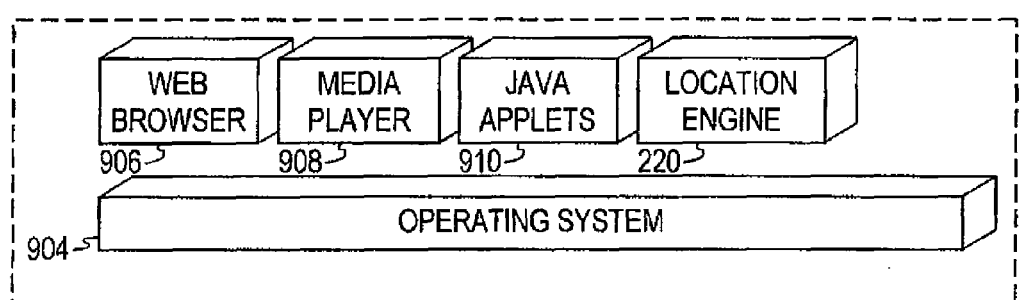
FIG. 9 shows a block diagram of an illustrative software configuration for a mobile device.

FIG. 9 illustrates a software environment 902 that may be implemented by the DSP 802. The DSP 802 executes operating system software 904 that provides a platform from which the rest of the software operates. The operating system generally provides processing resource management support. The operating system software 904 provides drivers for the mobile device hardware to make standardized interfaces available to application software. The operating system software 904 may transfer control between applications running on the mobile device 102. Also shown in FIG. 9 are a web browser 906 application, a media player 908, application JAVA applets 910, and a location engine 220 application. The web browser 906 application configures the mobile device 102 to operate as a web browser, allowing the user to enter information into forms and select links to retrieve and view web pages, including content from the content server 122. The media player 908 application configures the mobile device 102 to retrieve and play audio or audiovisual media on its own output components. The JAVA applets 910 may configure the mobile device 102 to provide games, utilities, and other functionality on the mobile device 102. These are further examples of content that may be provided by the content server 122. The location engine 220 application can execute a location fix technology for the mobile device 102.

Figure 10:
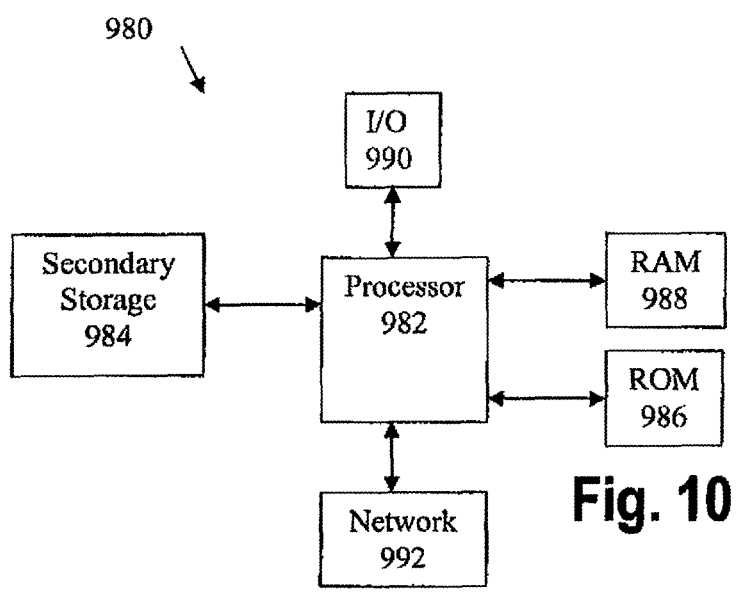
FIG. 10 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it FIG. 10 illustrates a typical, general-purpose computer system, such as the content server 122, suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) 990 devices, and network connectivity devices 992. The processor may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage. The RAM 988 is used to store volatile data and perhaps to store instructions. Access to both ROM 986 and RAM 988 is typically faster than to secondary storage 984.

I/O devices 990 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 992 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 992 may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity devices 992 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A security system worn by an individual for monitoring an adjacent area, comprising:
   a transparent display;
   a camera to capture an image;
   an audio device to input audio information associated with the image, wherein the audio information includes a priority associated with an individual in the image;
   a mobile device in communication with the camera and the audio device and the transparent display, wherein the transparent display is configured to display images captured via other mobile devices and information associated with the images captured via the other mobile devices, wherein at least some of the information is retrieved from an external database based on an analysis of individuals in the images using facial recognition software and a comparison of the individuals in the images to images stored in the external database, and wherein the mobile device is configured to:
      read, via a radio frequency identification (RFID) tag reader, an RFID tag associated with a tangible item,
      determine information associated with the RFID tag, wherein the information comprises at least one of an owner and a purchaser of the tangible item,
      output the information associated with the RFID tag to at least one of the audio device and the transparent display, identify an item of interest to a user of the mobile device via the transparent display based on the information associated with the RFID tag, and identify another, different item of interest based on comments input via the audio device; and a location engine associated with the mobile device, wherein the location engine is configured to determine a location of the mobile device.

2. The security system of claim 1, wherein the audio device is further configured to output information associated with images captured via other mobile devices.

3. The security system of claim 1, wherein the transparent display comprises a user wearable lens and a projector to project images on the lens.

4. The security system of claim 1, wherein the mobile device is further configured to promote speech recognition to convert information to text.

5. The security system of claim 1, wherein the location engine determines the location of the mobile device using at least one of a radio frequency identification technology, a global positioning system technology, a forward link triangulation technology, or a motion detector technology.

6. The security system of claim 1, wherein the mobile device further comprises a gestures engine, wherein the gestures engine executes a gesture recognition application, and wherein the gesture recognition application recognizes images of gestures captured by the camera.

7. The security system of claim 1, further comprising a motion detector associated with the mobile device, wherein the motion detector is configured to input location information associated with the image.

8. The security system of claim 1, further comprising at least one of a pointer or a keyboard to input information associated with the image.

9. The security system of claim 1, further comprising a digital compass to determine an orientation of the mobile device.

10. The security system of claim 1, further comprising a server in communication with the mobile device, wherein the server is configured to access a database of information associated with images.

11. The security system of claim 1, wherein the mobile device is configured to display images in response to at least one of a request input by a user of the mobile device or a geographic location of one or more of the other mobile devices.

12. The security system of claim 1, wherein the information further comprises at least one of information input by a user of the mobile device or a location of an item shown in the image.

13. The security system of claim 1, wherein the mobile device is further configured to receive additional information associated with the RFID tag, and wherein the additional information is input via at least one of the audio device, a pointer, or a camera associated with the mobile device.

14. The security system of claim 1, wherein the mobile device is further configured to output the information associated with the RFID tag to at least one of an audio device or a transparent display associated with another mobile device.

15. The security system of claim 1, wherein the mobile device is further configured to partition a view into sections, the audio device is configured to receive a verbal selection of at least one of the sections by the user of the mobile device, and the camera is configured to capture an image of the at least one of the sections in response to the verbal selection by the user, wherein the mobile device is further configured to associate information with the image of the at least one of the sections.

16. The security system of claim 15, wherein at least some of the information associated with the image of the at least one of the sections is retrieved from an external database based on an analysis of an individual in the image using facial recognition software and a comparison of the individual in the image to images stored in the external database.

17. The security system of claim 16, wherein at least some of the information associated with the image of the at least one of the sections is audio information input via the audio device that includes a priority associated with the individual in the image.

18. The security system of claim 17, wherein the mobile device is further configured to output the information associated with the image of the at least one of the sections and the image of the at least one of the sections to at least one of a transparent display or an audio device associated with another mobile device.

* * * * *